(12) United States Patent
Okano

(10) Patent No.: US 8,732,503 B2
(45) Date of Patent: May 20, 2014

(54) INFORMATION PROCESSING APPARATUS AND CONTROLLING METHOD THEREOF

(75) Inventor: Kenji Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/064,183

(22) Filed: Mar. 9, 2011

(65) Prior Publication Data

US 2011/0167288 A1     Jul. 7, 2011

Related U.S. Application Data

(63) Continuation of application No. PCT/JP2008/066585, filed on Sep. 12, 2008.

(51) Int. Cl.
*G06F 1/32* (2006.01)

(52) U.S. Cl.
USPC .......................................... 713/324; 713/320

(58) Field of Classification Search
USPC .......................... 713/300, 320, 322, 323, 324
See application file for complete search history.

(56) References Cited

U.S. PATENT DOCUMENTS

| | | | |
|---|---|---|---|
| 8,151,122 B1 * | 4/2012 | Ranganathan et al. | 713/300 |
| 2002/0188877 A1 * | 12/2002 | Buch | 713/320 |
| 2003/0177165 A1 | 9/2003 | Bradley et al. | |
| 2005/0060590 A1 * | 3/2005 | Bradley et al. | 713/320 |
| 2005/0138438 A1 * | 6/2005 | Bodas | 713/300 |
| 2009/0070611 A1 * | 3/2009 | Bower et al. | 713/322 |

FOREIGN PATENT DOCUMENTS

| | | |
|---|---|---|
| JP | 62-198949 | 9/1987 |
| JP | 9-179667 | 7/1997 |
| JP | 11-110063 | 4/1999 |
| JP | 2003-295983 | 10/2003 |
| JP | 2003-316751 | 11/2003 |

OTHER PUBLICATIONS

International Search Report for PCT/JP2008/066585, mailed Oct. 28, 2008.

* cited by examiner

*Primary Examiner* — Paul Yanchus, III
(74) *Attorney, Agent, or Firm* — Staas & Halsey LLP

(57) ABSTRACT

An information obtaining unit provided inside a system controller obtains operation states of processing units and processing units respectively of cabinets, calculates an average utilization of CPUs of the processing units, and determines whether or not any processing unit can be disconnected. When a hardware resource can be disconnected as a result of the determination, an electric power control determining unit calculates possible combinations of hardware resources to be disconnected and performs a disconnection by a cabinet unit when there is a combination enabling a disconnection by a cabinet unit.

7 Claims, 16 Drawing Sheets

FIG.8

| kthr | | | memory | | page | | | | | | | disk | | | | faults | | | cpu | | |
|---|---|---|---|---|---|---|---|---|---|---|---|---|---|---|---|---|---|---|---|---|---|
| r | b | w | swap | free | re | mf | pi | p | fr | de | sr | s0 | s1 | s2 | s3 | in | sy | cs | us | sy | id |
| 0 | 0 | 0 | 11456 | 4120 | 1 | 41 | 19 | 1 | 3 | 0 | 2 | 0 | 4 | 0 | 0 | 48 | 112 | 130 | 4 | 14 | 82 |
| 0 | 0 | 1 | 10132 | 4280 | 0 | 4 | 44 | 0 | 0 | 0 | 0 | 0 | 23 | 0 | 0 | 211 | 230 | 144 | 3 | 35 | 62 |
| 0 | 0 | 1 | 10132 | 4616 | 0 | 0 | 20 | 0 | 0 | 0 | 0 | 0 | 19 | 0 | 0 | 150 | 172 | 146 | 3 | 33 | 64 |
| 0 | 0 | 1 | 10132 | 5292 | 0 | 0 | 9 | 0 | 0 | 0 | 0 | 0 | 21 | 0 | 0 | 165 | 105 | 130 | 1 | 21 | 78 |

AVAILABLE MEMORY

CPU USAGE RATE

INFORMATION PROCESSING APPARATUS AND CONTROLLING METHOD THEREOF

CROSS-REFERENCE TO RELATED APPLICATION

This application is a continuation of PCT international application Ser. No. PCT/JP2008/066585 filed on Sep. 12, 2008 which designates the United States, incorporated herein by reference.

FIELD

The embodiments discussed herein are related to an information processing apparatus and a controlling method thereof.

BACKGROUND

Conventionally, a large-scale integration (LSI) has been used in a computing processor, i.e., a processor such as what is called a central processing unit (CPU). Recently, an electric power consumption of the LSI has increased in response to an increase in performance and the like of the LSI, so that a total electric power amount, including an energy consumption due to a cooling in response to the increase in the electric power consumption of the LSI, to be consumed in an entirety of a system provided with a server having a lot of LSIs has become large.

Increased electric power consumption in a system comes not only to an environmental issue in terms of an energy saving but also to an issue of causing a necessity of expanding cooling equipment to cope with an increase in a heat generation in response to the increase in the electric power consumption and also of increasing a running cost of the system. These issues have become salient especially in a data center which includes several hundreds or more of such servers and supports an infrastructure in a society. Therefore, it has been of significance to take measures for reducing an electric power consumption of a server in response to requirements for promoting an energy saving and reducing a running cost.

Meanwhile, a technique of improving a processing ability of an information processing apparatus by making a plurality of computing processes cooperate to perform an information process has been used. For example, a computing processor (CPU), a storage device (memory), an input/output device (I/O device), and the like are collected as a processing unit (a system board) in a server apparatus, a plurality of processing units are operated at the same time to divide processes, and thereby a processing ability as a whole is improved.

However, a load in an information process is not constant and all CPUs, memories, and system boards are not necessarily required to operate at any time. When a plurality of system boards are in operation, electric power consumption increases for the operation. Therefore, an operation of a lot of system boards at a state with a relatively light load results in useless electric power consumption.

In response, a measure for reducing an electric power consumption has been taken conventionally in which a power supply to a circuit not in use is stopped in an inside of an LSI which is used as a computing processor. Besides, a technique of applying a dynamic fallback of hardware resources to reduce total electric power consumption has been considered based on a system performance and a resource specification condition. Detailed information of such techniques can be obtained in Japanese Laid-open Patent Publication No. H9-179667 and Japanese Laid-open Patent Publication No. 2003-316751.

However, an electric power reduction in an entirety of a server cannot be realized sufficiently in the configuration of reducing an electric power in an inside of an LSI, for example. In other words, since an electric power consumed by an LSI is a part of the electric power consumed in the entirety of the server, a process of saving electric power consumption in wider range has been sought.

Especially in the conventional technique, elements except for a processing ability such as an electric power used for operating a cabinet which houses a plurality of processing units and an electric power used for cooling the processing units and the cabinet have not been taken into consideration. Therefore, the electric power is consumed uselessly in the conventional technique and there is a problem of not being able to efficiently reduce the electric power consumption in the entirety of the system.

SUMMARY

According to an aspect of an embodiment of the invention, an information processing apparatus includes a first cabinet including a first processing unit provided with a first computing processor and a first computing process utilization (usage rate) measuring unit which measures a computing process utilization (usage rate) indicating a load per unit time of the first computing processor, and a second processing unit provided with a second computing processor and a second computing process utilization measuring unit which measures a computing process utilization of the second computing processor; a second cabinet including a third processing unit provided with a third computing processor and a third computing process utilization measuring unit which measures a computing process utilization of the third computing processor, and a fourth processing unit provided with a fourth computing processor and a fourth computing process utilization measuring unit which measures a computing process utilization of the fourth computing processor; an operating system part that is executed by at least one of the first to the fourth computing processors and notifies, after obtaining, the first to the fourth computing process utilizations from the first to the fourth computing process utilization measuring units; and a resource controller that executes one of a disconnection and an incorporation of at least one of the first to the fourth processing units based on the first to the fourth computing process utilizations notified from the operating system part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is an explanatory view of a specific example of a result of executing an information obtaining command;

DESCRIPTION OF EMBODIMENTS

Preferred embodiments of an information processing apparatus, a controlling method of the information processing apparatus, and a controlling program of the information processing apparatus will be explained in detail below with reference to the accompanying drawings.

[a] First Embodiment

Figure 1:
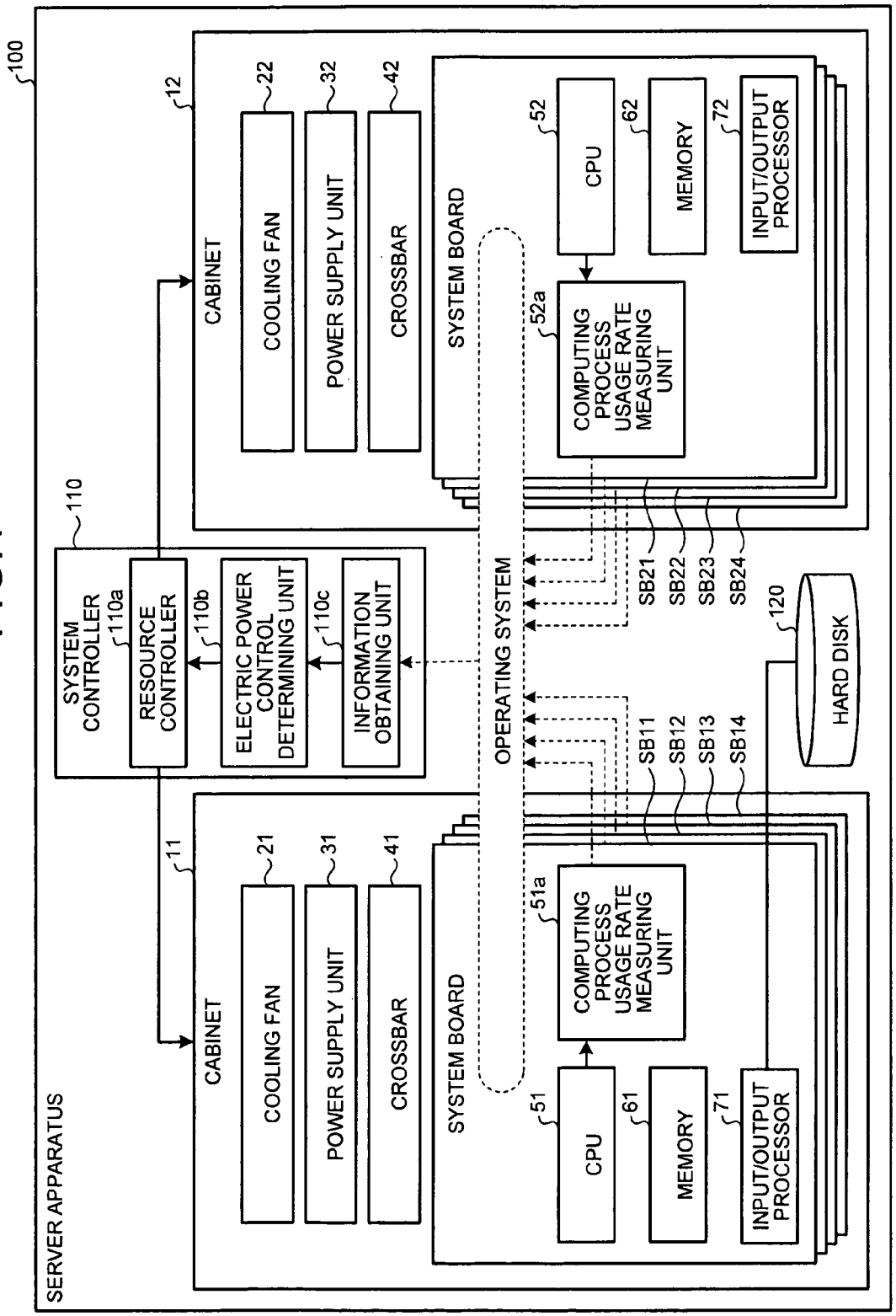
FIG. 1 is a brief overview of a configuration of a server apparatus as an information processing apparatus according to a first embodiment.

FIG. 1 is a brief overview of a configuration of a server apparatus 100 as an information processing apparatus according to a first embodiment. The server apparatus 100 illustrated in FIG. 1 is provided with a plurality of cabinets 11 and 12, a system controller 110, and a hard disk 120.

The cabinet 11 is provided with a plurality of system boards SB11 to SB14, a crossbar 41 which connects the system boards SB11 to SB14, a cooling fan 21 which cools the system boards SB11 to SB14 and the crossbar 41, and a power supply unit 31 which supplies an electric power to each device in the cabinet 11.

In addition, the system board SB11 is provided with a central processing unit (CPU) 51, a computing process utilization measuring unit 51a such as a performance analyzer which obtains an operation state of the CPU 51, a memory 61 as a storage device, and an input/output processor 71 to which external device such as a hard disk drive can be connected. The system boards SB12 to SB14, similarly to the system board SB11, have own CPU, computing process utilization measuring unit, memory, and input/output processor.

Besides, the cabinet 12 is provided with a plurality of system boards SB21 to SB24, a crossbar 42 which connects the system boards SB21 to SB24, a cooling fan 22 which cools the system boards SB21 to SB24 and the crossbar 42, and a power supply unit 32 which supplies an electric power to each device in the cabinet 12.

In addition, the system board SB21 is provided with a CPU 52, a computing process utilization measuring unit 52a which obtains an operation state of the CPU 52, a memory 62 as a storage device, and an input/output processor 72. The system boards SB22 to SB24, similarly to the system board SB21, have own CPU, computing process utilization measuring unit, memory, and input/output processor.

The system boards SB11 to SB14 and the system boards SB21 to SB24 operate one operation system (OS) overall in cooperation with each other. The operation system is stored as program data in a hard disk 120 which is realized by a hard disk drive and the like. In the configuration illustrated in FIG. 1, the hard disk 120 is connected only to the input/output processor 71 of the system board SB11. Therefore, the system board SB11 reads out program data of the operating system from the hard disk 120 on a start-up time of the server apparatus 100. When an access to the hard disk 120 is required also after the start-up, the system board SB11 accesses the hard disk 120.

The system controller 110 controls the entirety of the server apparatus 100. The system controller 110 is provided with a resource controller 110a, a electric power control determining unit 110b, and an information obtaining unit 110c. These processing units may be realized by a hardware logic or may be realized by executing a software program such as a firmware by a processor. The information obtaining unit 110c monitors a usage state of hardware resources of the system. Specifically, the information obtaining unit 110c performs a communication with the operating system to obtain a usage amount of the hardware resources. Other methods, including a method of accessing directly from the system controller 110 the performance analyzing function realized by a hardware like the computing process utilization measuring unit and checking a usage state of the hardware resources for example, may be adopted. The information obtaining unit 110c assumes that a redundant hardware resource is present when a hardware resource stays in an unused state during a predetermined period of time based on the obtained information.

The resource controller 110a performs a process of dynamically disconnecting a redundant hardware resource by a system board unit (the process being called "dynamic reconfiguration"). By the dynamic reconfiguration, an entire power source in a system board can be cut off and thereby electric power consumption can be reduced. Moreover, when all system boards in one cabinet are disconnected, a cooling fan, a power supply unit, and a crossbar of the cabinet are stopped and an electric power consumption can be stopped in wider range than a case of partly stopping a power supply in an inside of an LSI and a case of stopping a power supply by a system board unit, so that an electric power reduction amount can be increased.

When redundant hardware resources are present, the electric power control determining unit 110b determines possible combinations of hardware resources to be disconnected, selects a combination the electric power consumption of which is the least thereamong, and makes the resource controller 110a accordingly perform the disconnection.

For example, a case in which a half of the eight system boards SB11 to SB14 and system boards SB21 to SB24, i.e., four system boards can be disconnected will be considered. First, the system board SB11 is exempt from a selection target for disconnection since the hard disk 120 is connected only to the system boards SB11. Then, examining possible combinations for disconnection among the remaining seven system boards, there remain a case of disconnecting all of the four system boards SB21 to SB24 provided in the cabinet 12 as illustrated in FIG. 2 and another case of dispersing system boards for disconnection in the cabinet 11 and the cabinet 12 as illustrated in FIG. 3.

Figure 2:
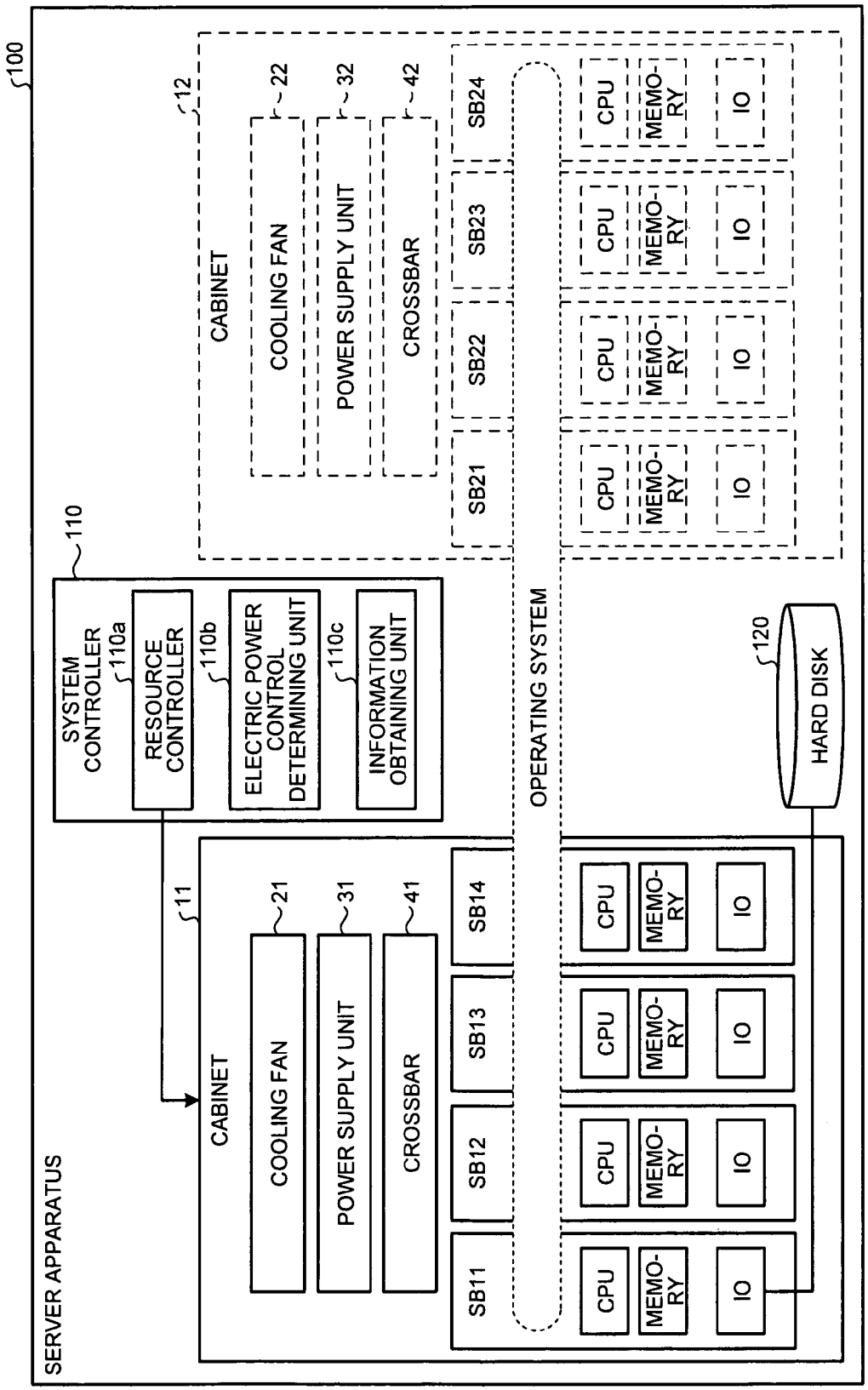
FIG. 2 is an explanatory view of a case of disconnecting all system boards in one cabinet.
Figure 3:
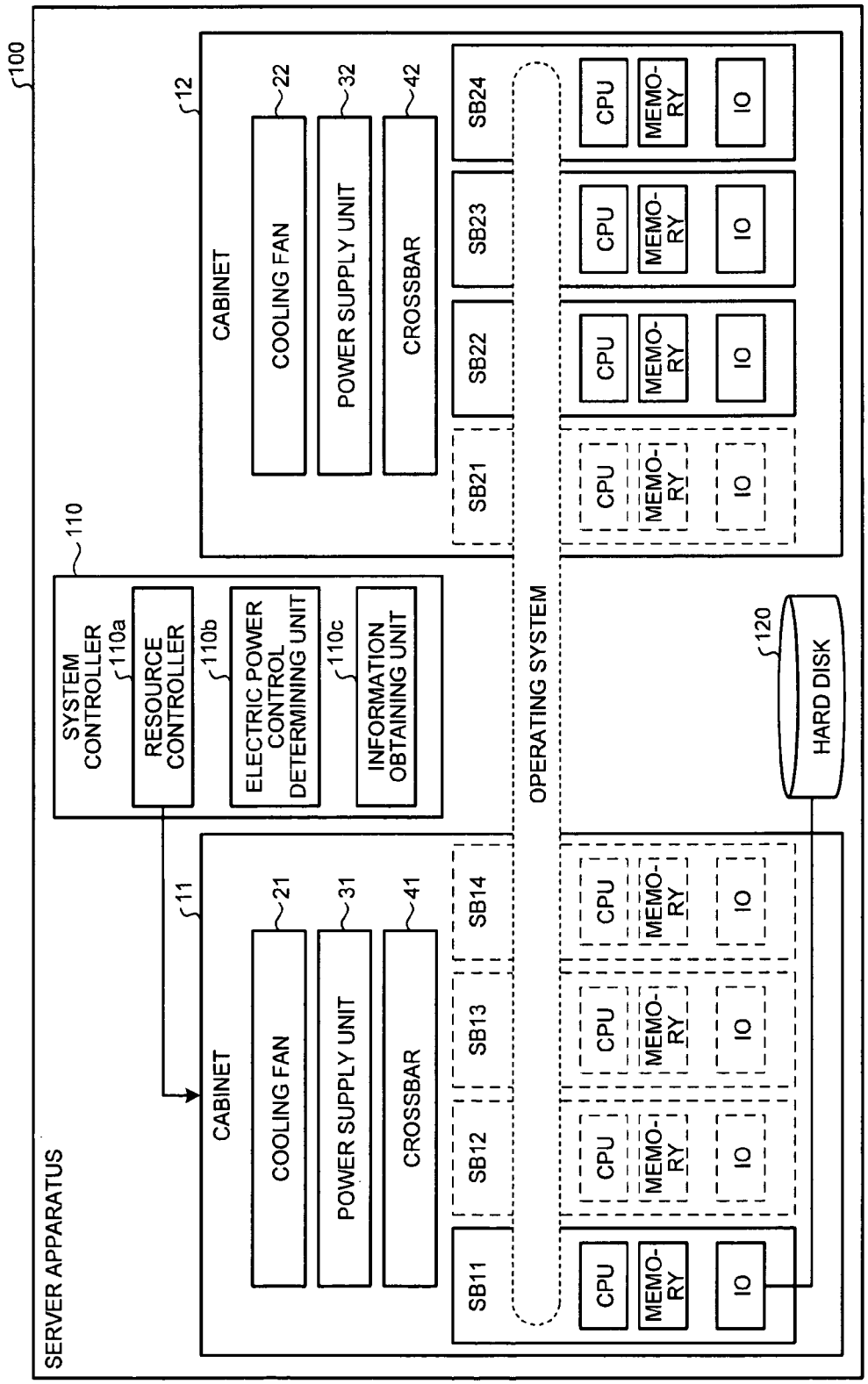
FIG. 3 is an explanatory view of a case in which a system board in operation remains in both cabinets.
Figure 4:
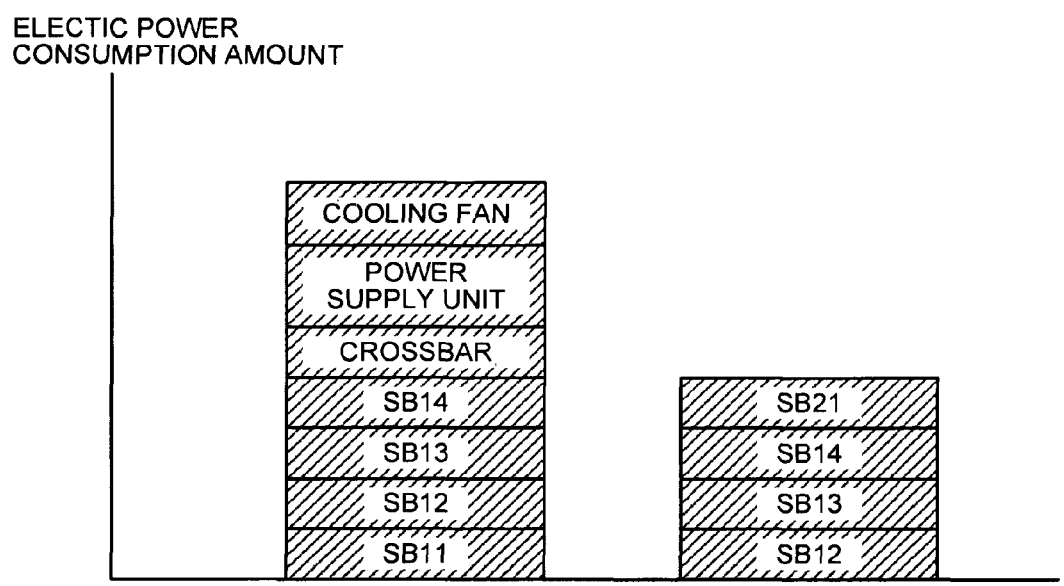
FIG. 4 is a view comparatively explaining electric power consumption.

Here, when all of the system boards provided in the cabinet 12 are disconnected as illustrated in FIG. 2, the cooling fan 22, the power supply unit 32, and the crossbar 42 of the cabinet 12 can also be stopped since there remains no system board to operate. In contrast, when operating system boards remain in both of the cabinet 11 and the cabinet 12 after disconnection as illustrated in FIG. 3, operations of the cooling fan, the power supply unit, and the crossbar cannot be stopped. Therefore, the amount of the electric power consumption which can be reduced becomes, when compared, larger in the case of disconnecting the entirety of the cabinet 12 than the case of dispersing system boards to be disconnected, as illustrated in FIG. 4.

Figure 5:
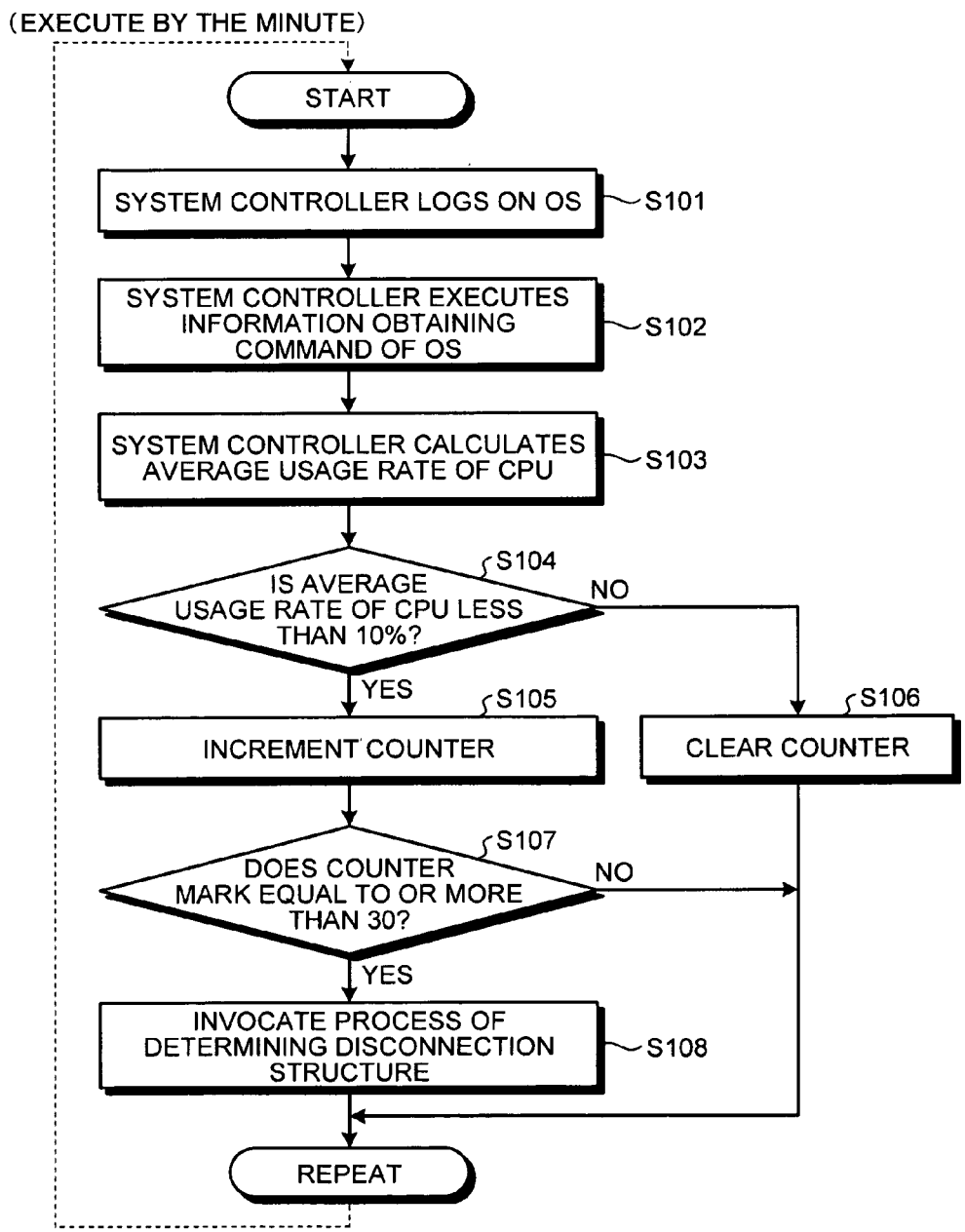
FIG. 5 is a flowchart of a process of determining whether or not to disconnect a hardware resource in the first embodiment.

Next, a processing operation of the system controller 110 will be explained. FIG. 5 is a flowchart of a process of determining whether or not to disconnect a hardware resource performed by the system controller 110. The flowchart in FIG. 5 illustrates a processing operation which is repetitively executed at predetermined intervals, for example, at one minute intervals, by the information obtaining unit $110c$ of the system controller 110.

The information obtaining unit $110c$ first logs on the operating system (step S101) and executes an information obtaining command of the operating system (step S102). The information obtaining unit $110c$ calculates an average utilization of CPUs of the system boards SB11 to SB14 and the system boards SB21 to SB24 from the information obtained as a result of the command execution (step S103).

When the calculated average utilization of the CPUs is less than 10% ("Yes" at step S104) for example, the information obtaining unit $110c$ increments a figure of a counter by one (step S105). On the other hand, when the average utilization of the CPUs is equal to or more than 10% ("No" at step S104), the information obtaining unit $110c$ clears the figure of the counter (step S106) to end the process.

When the counter marks equal to or more than 30, for example, i.e., when a state in which the average utilization of the CPUs stays less than 10% continues for 30 minutes or more ("Yes" at step S107), the information obtaining unit $110c$ invokes a process of determining a disconnection structure (step S108) to end the process, and ends the process directly when the counter marks less than 30, for example ("No" at step S107).

Figure 6:
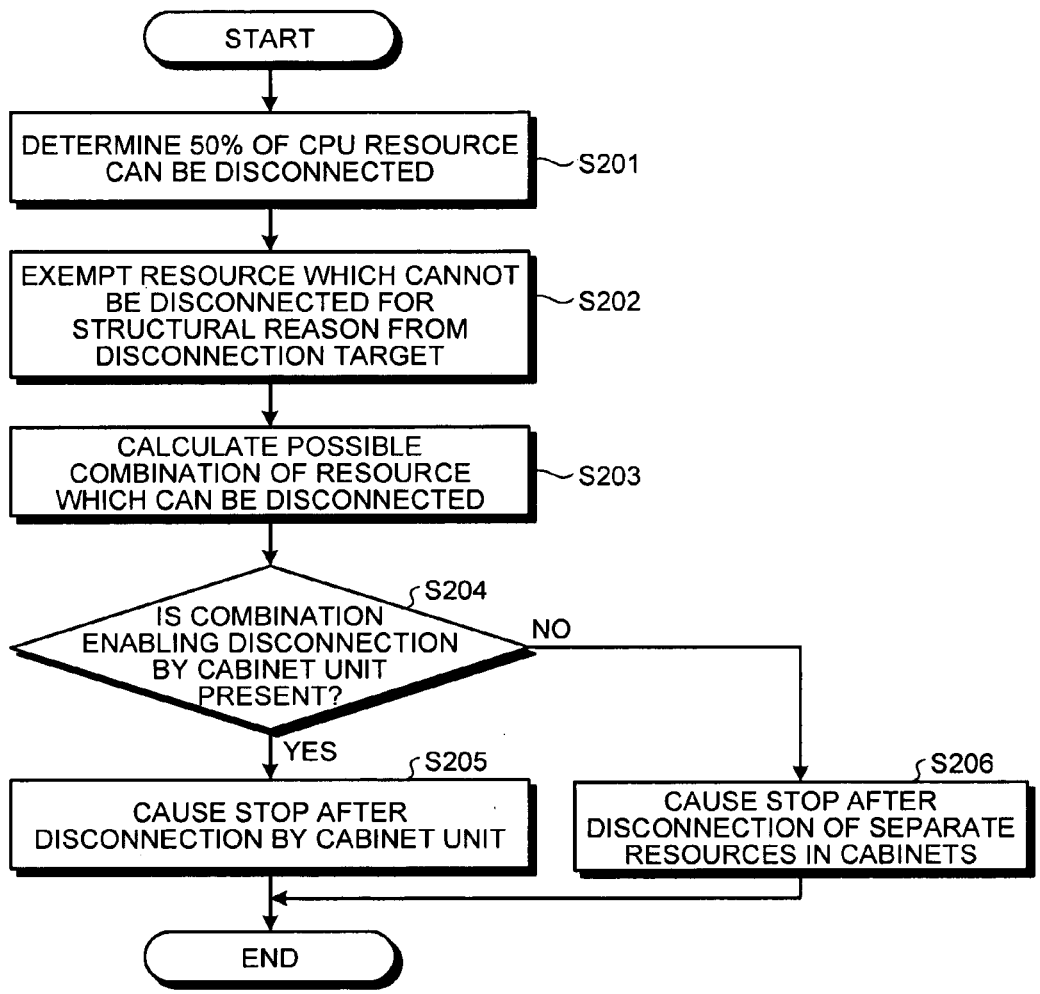
FIG. 6 is a flowchart of a process of determining a disconnection structure in the first embodiment.

FIG. 6 is a flowchart of the process of determining a disconnection structure. The processing operation illustrated in FIG. 6 is performed by the electric power control determining unit $110b$ in response to the invocation from the information obtaining unit $110c$.

When the state in which the average utilization of the CPUs stays less than 10% continues for 30 minutes or more, the electric power control determining unit $110b$ determines that a half of the CPU resources can be disconnected (step S201). The electric power control determining unit $110b$ then exempts a hardware resource which cannot be disconnected for a structural reason of the system from a disconnection target (step S202) and calculates possible combinations of hardware resources which can be disconnected (step S203).

After that, the electric power control determining unit $110b$ determines whether or not there is a combination enabling a disconnection by a cabinet unit among the possible combinations of the hardware resources which can be disconnected (step S204). When there is a combination enabling a disconnection by a cabinet unit as a result of the determination ("Yes" at step S204), the electric power control determining unit $110b$ operates the resource controller $110a$ to perform the disconnection by a cabinet unit (step S205) to end the process. When there is no combination enabling a disconnection by a cabinet unit ("No" at step S204), the electric power control determining unit $110b$ operates the resource controller $110a$ to disconnect separate resources in both of the cabinets (step S206) to end the process.

Figure 7:
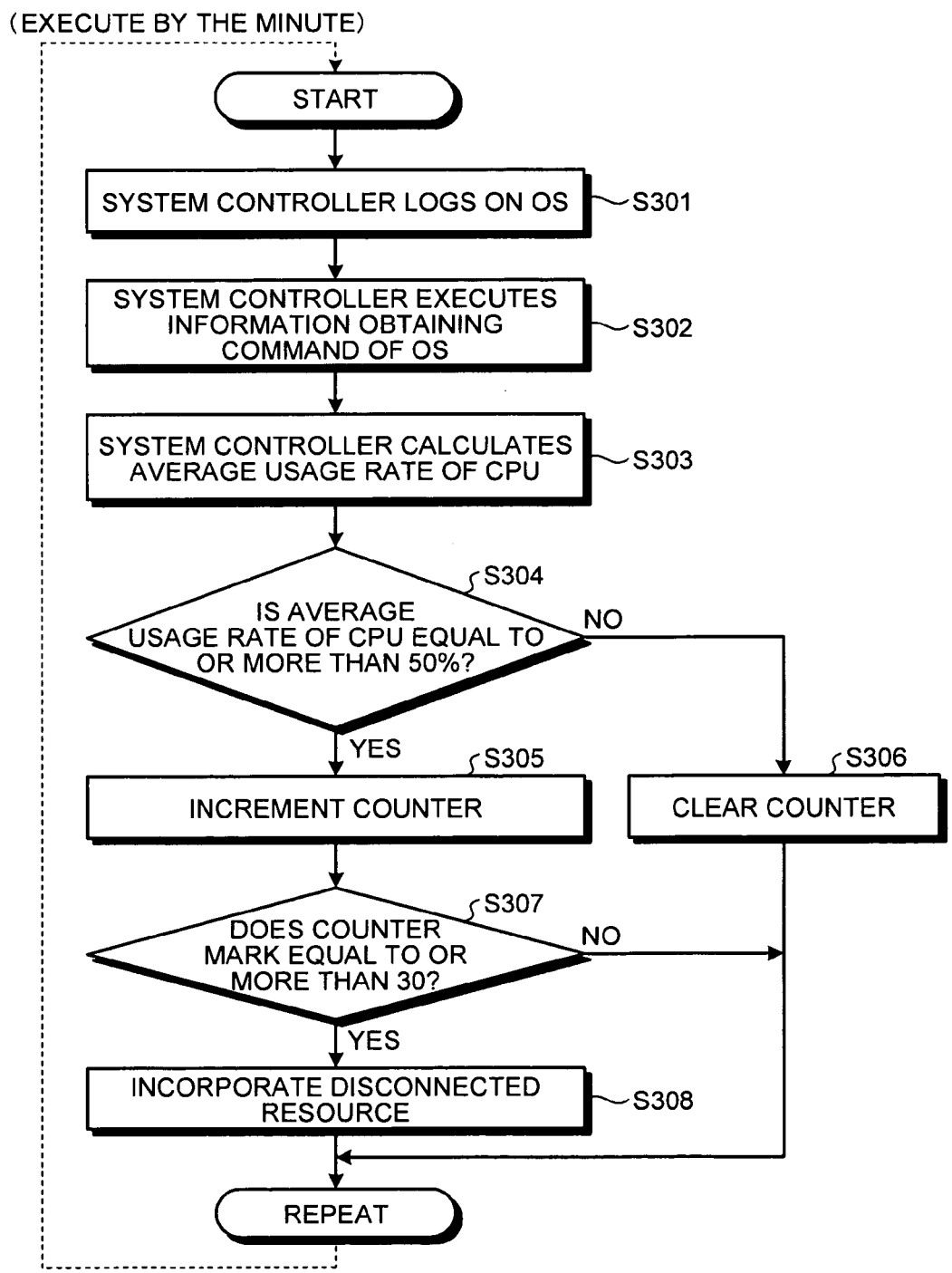
FIG. 7 is a flowchart of a process of determining a hardware resource incorporation in the first embodiment.

When a load becomes heavier after the disconnection of the hardware resources, a process of again incorporating the disconnected hardware resources is performed. FIG. 7 is a flowchart of a process of determining a hardware resource incorporation performed by the system controller 110. The flowchart in FIG. 7 illustrates a processing operation which is repetitively executed at predetermined intervals, for example, at one minute intervals, by the information obtaining unit $110c$ of the system controller 110.

The information obtaining unit $110c$ first logs on the operating system (step S301) and executes an information obtaining command of the operating system (step S302). The information obtaining unit $110c$ calculates an average utilization of the CPUs of the system boards SB11 to SB14 and the system boards SB21 to SB24 from the information obtained as a result of the command execution (step S303).

When the calculated average utilization of the CPUs is equal to or more than 50% ("Yes" at step S304), the information obtaining unit $110c$ increments a figure of a counter by one (step S305). On the other hand, when the average utilization of the CPUs is less than 50%, for example ("No" at step S304), the information obtaining unit $110c$ clears the figure of the counter (step S306) to end the process.

When the counter marks equal to or more than 30, i.e., when a state in which the average utilization of the CPUs stays equal to or more than 50% continues for 30 minutes or more ("Yes" at step S307), the information obtaining unit $110c$ operates the resource controller $110a$ to incorporate the disconnected hardware resources (step S308) to end the process, and ends the process directly when the counter marks less than 30, for example ("No" at step S307).

The information obtaining command used in the explanation of FIGS. 5 and 7 represents a command which allows recognizing a usage state of a hardware resource of a system such as a "vmstat" command and a "top" command. The "vmstat" command and the "top" command allow obtaining a usage amount and a utilization respectively of a memory and a CPU incorporated in the operating system. Besides, the system controller 110 retains information of the total number of CPUs mounted on the system and a total memory capacity.

FIG. 8 is an explanatory view of a specific example of a result of executing the information obtaining command. Each of the figures in a column "id" of an item "cpu" in data illustrated in FIG. 8 indicates an idle time, i.e., an unused time rate of each CPU. In the example of FIG. 8, $$(82+62+64+78)/4=71.5$$

is obtained and an idle time equivalent to 71.5% obtained through the averaging of four CPUs is present. In other words, an average utilization of the CPUs is 29.5% in this example.

Similarly, each of the figures in a column "free" of an item "memory" indicates an available memory capacity. A sum of the figures is treated as a total available memory capacity. Since the system controller 110 retains the information of the total memory capacity in advance, an average utilization of the memories can be obtained from the available memory capacity.

As explained so far, the information obtaining unit $110c$ provided in the inside of the system controller 110 obtains the operation state of the system boards SB11 to SB14 of the cabinet 11 and the operation state of the system boards SB21 to SB24 of the cabinet 12 in the server apparatus 100 according to the first embodiment. Then, the information obtaining unit 110c calculates the average utilization of the CPUs of the system boards and determines whether or not any processing unit can be disconnected. When the disconnection of any hardware resources is available as a result of the determination, the electric power control determining unit 110b calculates possible combinations of the hardware resources to be disconnected. When there is a combination enabling a disconnection by a cabinet unit among the calculated combinations of the hardware resources to be disconnected, the disconnection by a cabinet unit is performed. The disconnection by a cabinet unit allows, in addition to reducing the electric power consumption in a processing unit itself, stopping facilities such as the cooling fan, the power supply unit, and the crossbar provided for each cabinet and thereby efficiently reducing the electric power consumption.

[b] Second Embodiment

Figure 9:
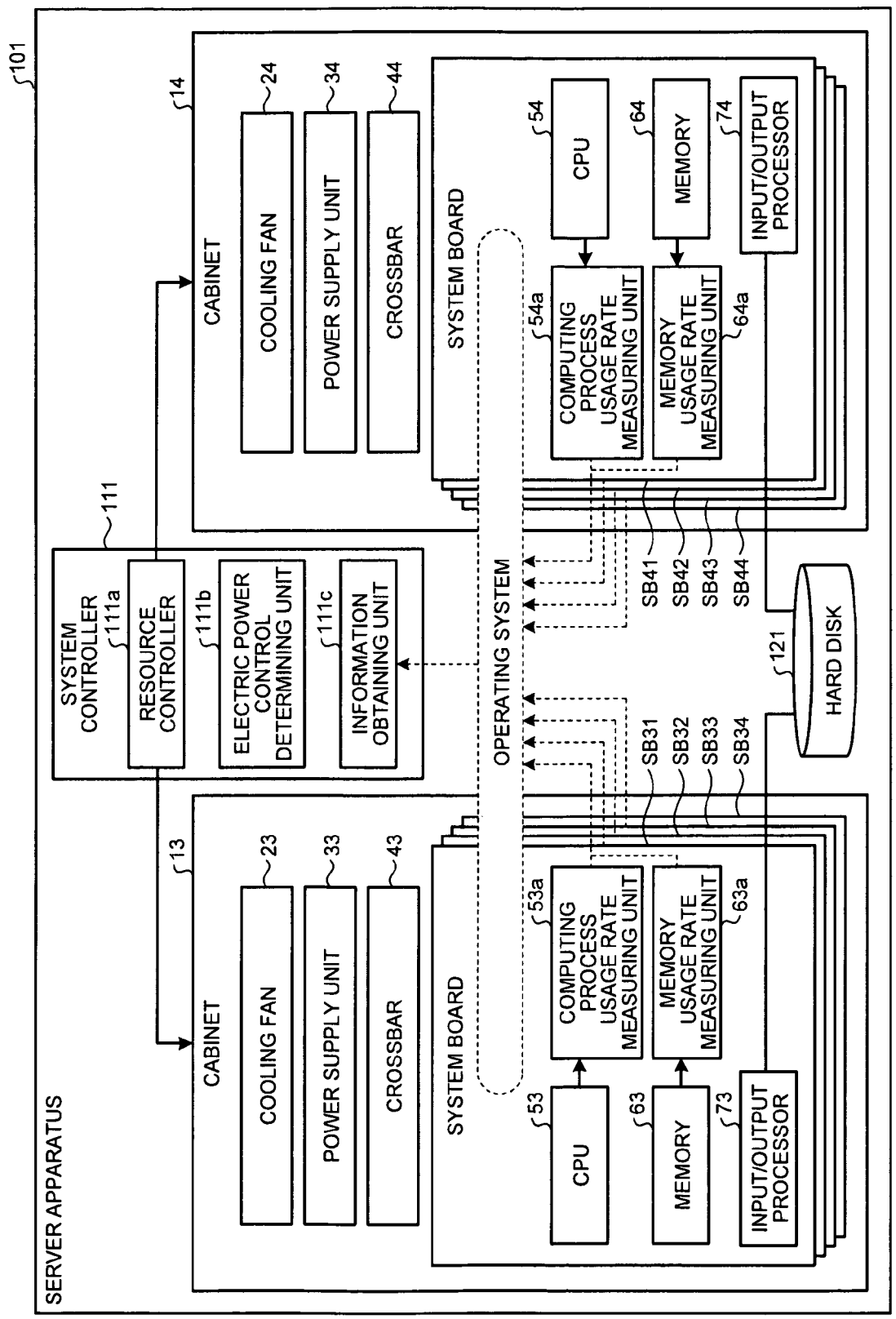
FIG. 9 is a brief overview of a server apparatus as an information processing apparatus according to a second embodiment.

In a second embodiment, a configuration in a case of determining whether or not to disconnect a hardware resource and determining a hardware resource to be disconnected based on a utilization of memories in addition to a utilization of CPUs will be explained. FIG. 9 is a brief overview of a server apparatus 101 as an information processing apparatus according to the second embodiment. The server apparatus 101 illustrated in FIG. 9 is provided with a plurality of cabinets 13 and 14, a system controller 111, and a hard disk 121.

The cabinet 13 is provided with a plurality of system boards SB31 to SB34, a crossbar 43 which connects the system boards SB31 to SB34, a cooling fan 23 which cools the system boards SB31 to SB34 and the crossbar 43, and a power supply unit 33 which supplies an electric power to each device in the cabinet 13.

In addition, the system board SB31 is provided with a CPU 53, a computing process utilization measuring unit 53a which obtains an operation state of the CPU 53, a memory 63 as a storage device, a memory utilization measuring unit 53a which obtains an operation state of the memory 63, and an input/output processor 73. The system boards SB32 to SB34, similarly to the system board SB31, have own CPU, computing process utilization measuring unit, memory, memory and input/output processor.

Besides, the cabinet 14 is provided with a plurality of system boards SB41 to SB44, a crossbar 44 which connects the system boards SB41 to SB44, a cooling fan 24 which cools the system boards SB41 to SB44 and the crossbar 44, and a power supply unit 34 which supplies an electric power to each device in the cabinet 14.

In addition, the system board SB41 is provided with a CPU 54, a computing process utilization measuring unit 54a which obtains an operation state of the CPU 54, a memory 64 as a storage device, a memory utilization measuring unit 64a which obtains an operation state of the memory 64, and an input/output processor 74. The system boards SB42 to SB44, similarly to the system board SB41, have own CPU, computing process utilization measuring unit, memory, and input/output processor.

The system boards SB31 to SB34 and the system boards SB41 to SB44 operate one operation system (OS) overall in cooperation with each other. The operation system is stored as program data in the hard disk 121 which is realized by a hard disk drive and the like. In the configuration illustrated in FIG. 9, the hard disk 121 is connected only to the input/output processor 73 of the system board SB31 and the input/output processor 74 of the system board SB41. Therefore, one of the system board SB31 and the system board SB41 reads out program data of the operating system from the hard disk 121 on a start-up time of the server apparatus 101. When an access to the hard disk 121 is required also after the start-up, one of the system boards SB31 and SB41 accesses the hard disk 121.

The system controller 111 controls an entirety of the server apparatus 101 and is provided with a resource controller 111a, a electric power control determining unit 111b, and an information obtaining unit 111c. These processing units may be realized by a hardware or may be realized as a software program. The information obtaining unit 111c monitors a usage state of hardware resources of the system. Specifically, the information obtaining unit 111c performs a communication with the operating system, obtains respective usage states of CPUs and memories, and determines whether or not to disconnect a hardware resource.

In disconnecting a hardware resource, the electric power control determining unit 111b takes a memory capacity of each system board into consideration, then determines possible hardware combinations for disconnection, selects a combination the electric power consumption of which is the least thereamong, and makes the resource controller 111a perform the disconnection.

For example, a case in which a memory capacity of the system boards SB31 to SB34 is two gigabytes, a memory capacity of the system boards SB41 to SB44 is eight gigabytes, and a half of the system boards, i.e., four system boards can be disconnected will be considered.

First, all system boards including the system boards SB31 and SB41 become a disconnection target though both of the system boards SB31 and SB41 cannot be disconnected at the same time since the hard disk 121 is connected to the system boards SB31 and SB41.

Figure 10:
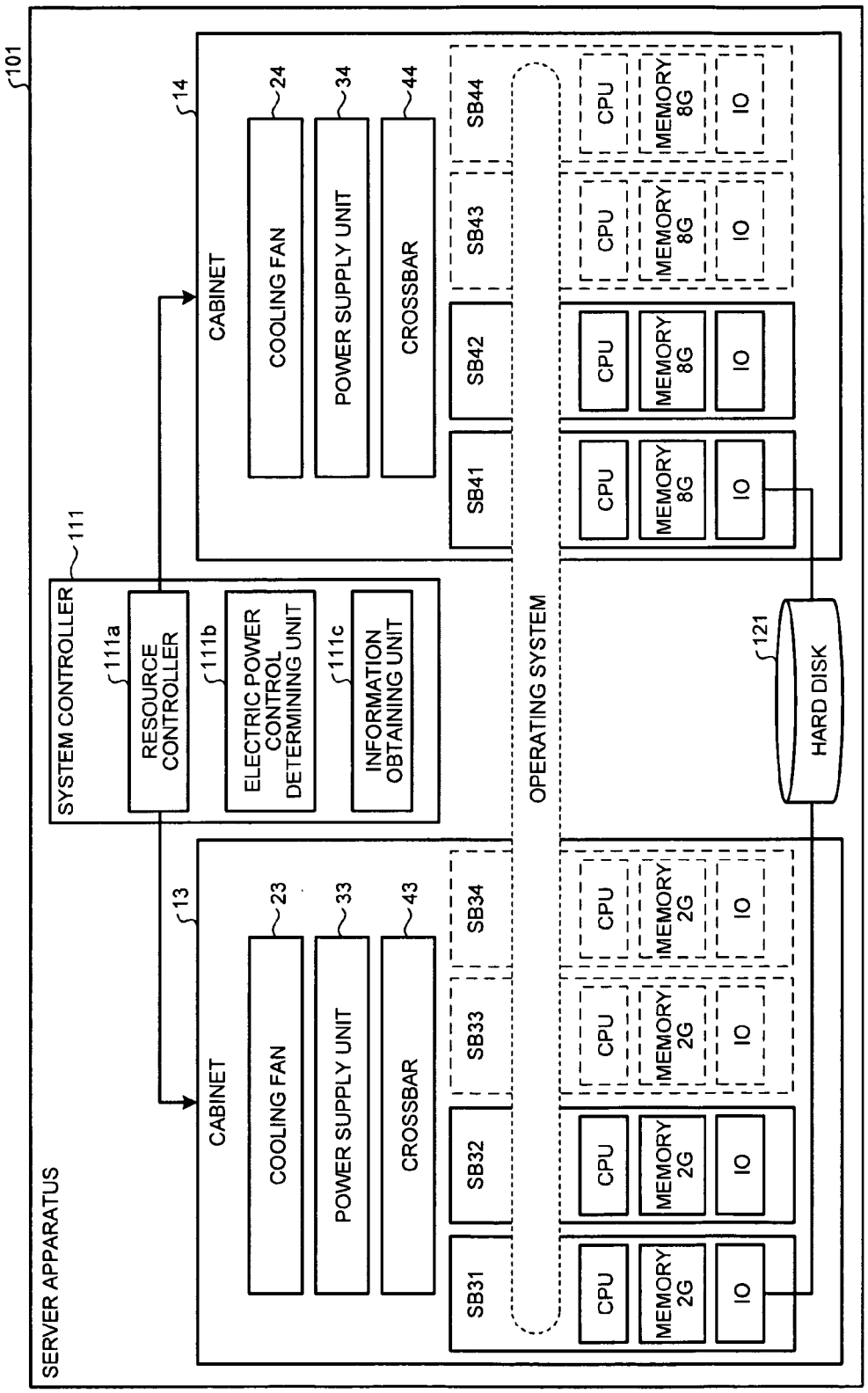
FIG. 10 is an explanatory view of a case in which a system board in operation remains in both cabinets.

When two system boards in each of the cabinets 13 and 14 are disconnected as illustrated in FIG. 10, the number of CPUs and the memory capacity become half. However, since system boards in operation remain in both cabinets after the disconnection, the operations of the cooling fan, the power supply unit, and the crossbar cannot be stopped.

Figure 11:
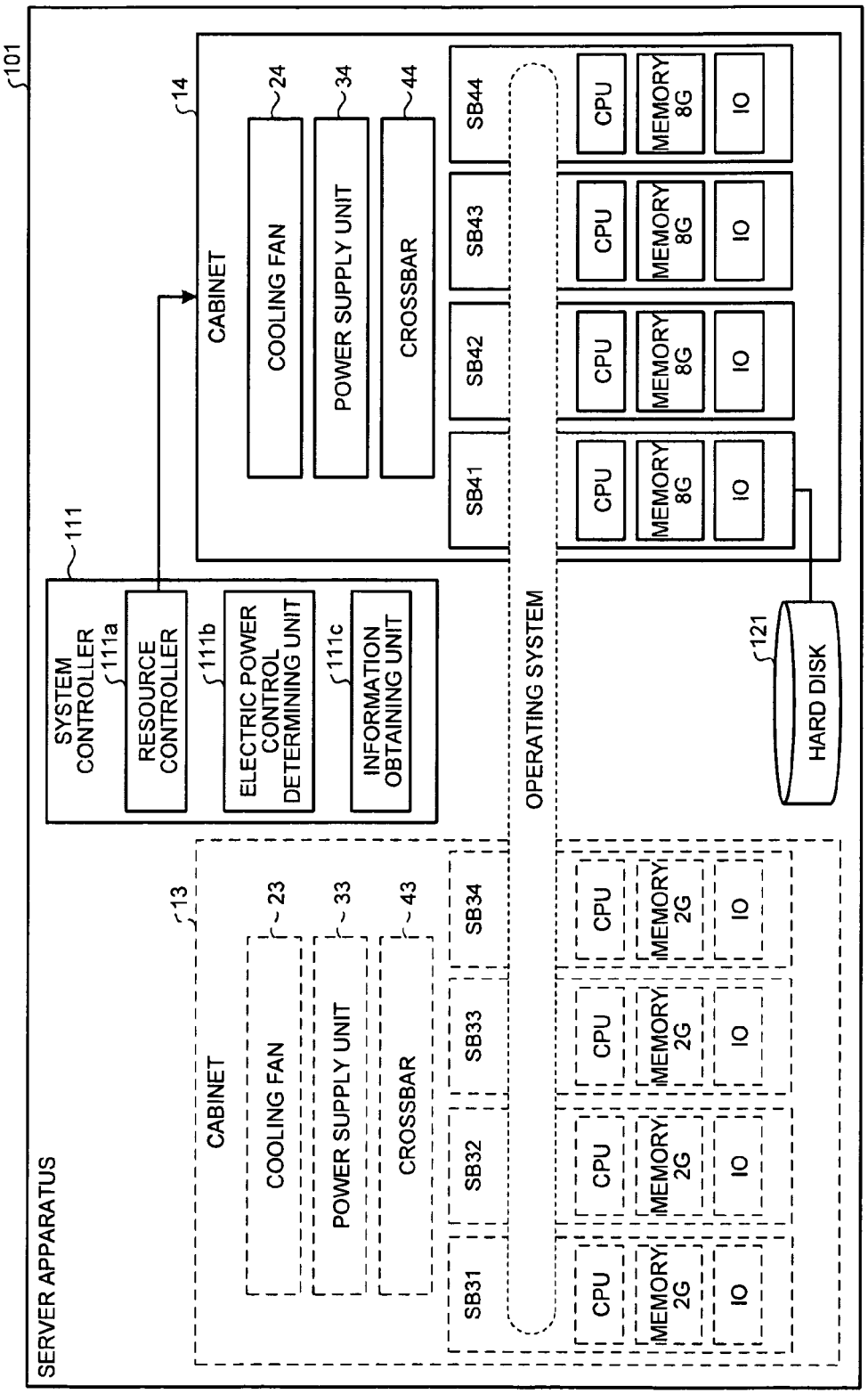
FIG. 11 is an explanatory view of a case of disconnecting all system boards in one cabinet.

On the other hand, though a reduction amount of the memories is less than 50% when all of the four system boards SB31 to SB34 provided in the cabinet 13 are disconnected as illustrated in FIG. 11, the cooling fan 23, the power supply unit 33, and the crossbar 43 of the cabinet 13 can be stopped.

As far as the electric power consumption amount which can be reduced is concerned, the amount of the electric power consumption which can be reduced is larger in the case of disconnecting the entirety of the cabinet 13 as illustrated in FIG. 11 than the case of dispersing system boards.

Here, a configuration of disconnecting all the system boards of the cabinet 14 is excluded from possible cases for disconnection since, though the number of CPUs becomes half, a memory capacity is reduced by 80% and thereby an insufficiency in memory after the reduction comes up in the configuration.

Figure 12:
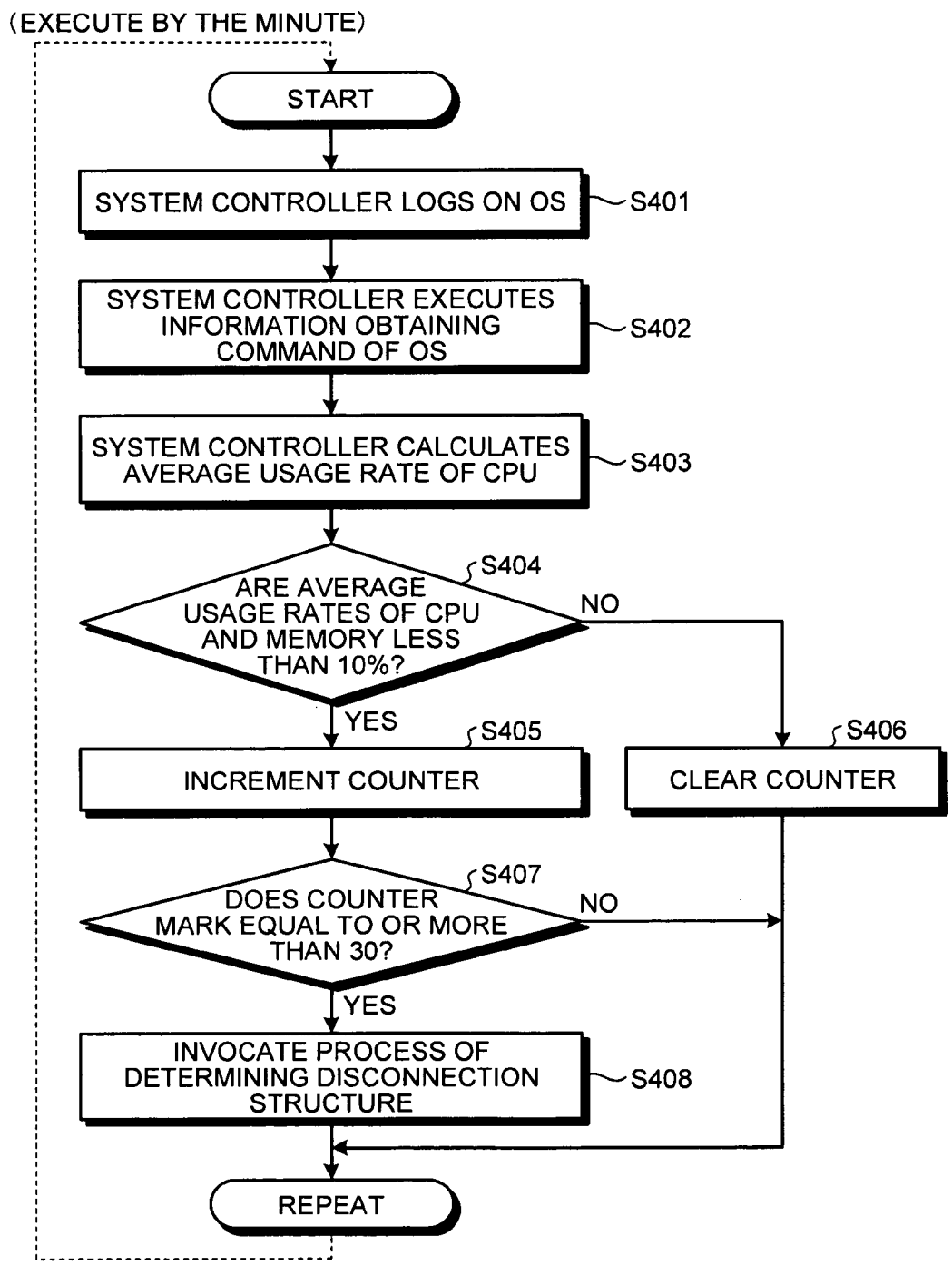
FIG. 12 is a flowchart of a process of determining whether or not to disconnect a hardware resource in the second embodiment.

Next, a processing operation of the system controller 111 will be explained. FIG. 12 is a flowchart of a process of determining whether or not to disconnect a hardware resource performed by the system controller 111. The flowchart in FIG. 12 illustrates a processing operation which is repetitively executed at predetermined intervals, for example, at one minute intervals, by the information obtaining unit 111c of the system controller 111.

The information obtaining unit 111c first logs on the operating system (step S401) and executes an information obtaining command of the operating system (step S402). The information obtaining unit 111c calculates average utilizations of CPUs and memories of the system boards SB31 to SB34 and the system boards SB41 to SB44 from the information obtained as a result of the command execution (step S403).

When both of the calculated average utilizations of the CPUs and the memories are less than 10% ("Yes" at step S404) for example, the information obtaining unit 111c increments a figure of a counter by one (step S405). On the other hand, when one of the average utilizations of the CPUs and the memories is equal to or more than 10% ("No" at step S404), the information obtaining unit 111c clears the figure of the counter (step S406) to end the process.

When the counter marks equal to or more than 30, i.e., when a state in which both of the average utilizations of the CPUs and the memories stay less than 10% continues for 30 minutes or more, for example ("Yes" at step S407), the information obtaining unit 111c invokes a process of determining a disconnection structure (step S408) to end the process, and ends the process directly when the counter marks less than 30, for example ("No" at step S407).

Figure 13:
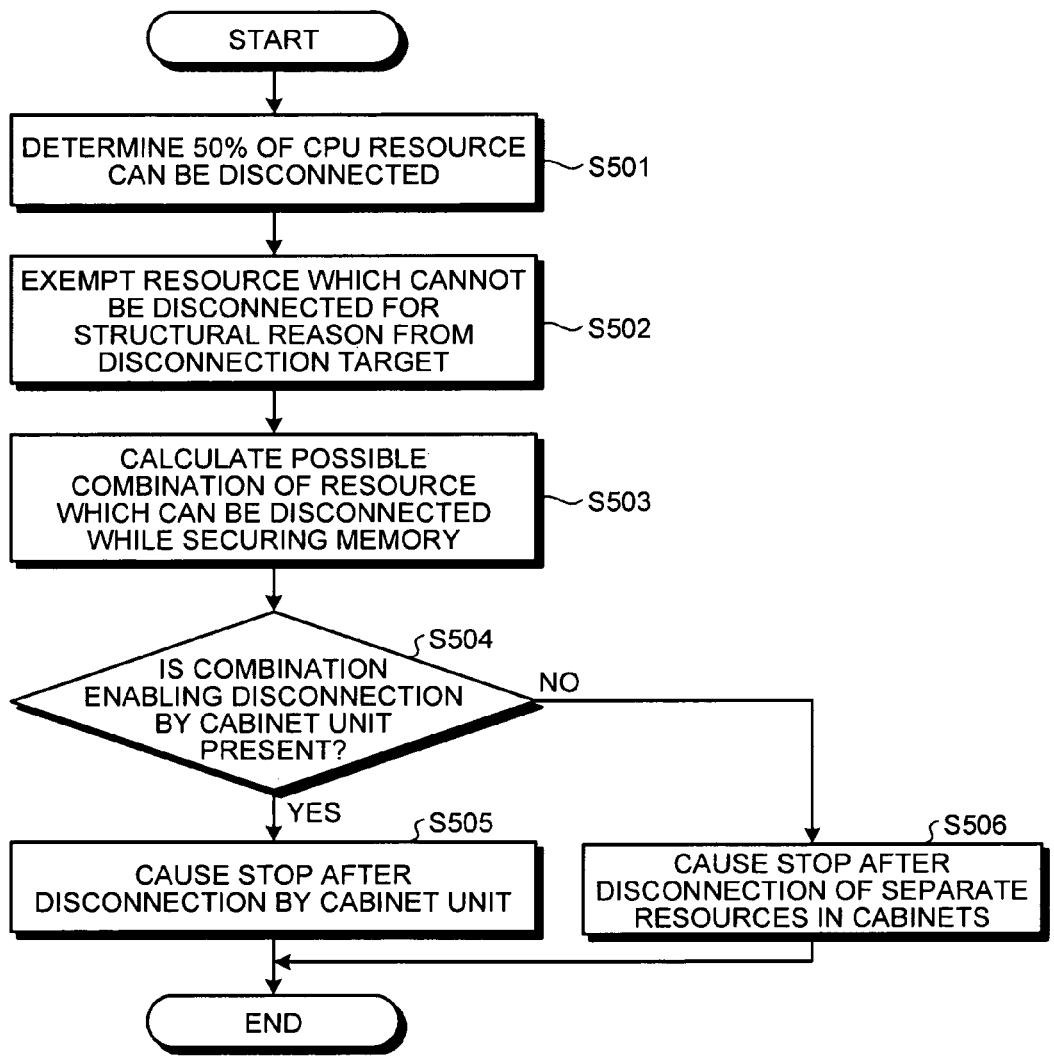
FIG. 13 is a flowchart of a process of determining a disconnection structure in the second embodiment.

FIG. 13 is a flowchart of the process of determining a disconnection structure. The processing operation illustrated in FIG. 13 is performed by the electric power control determining unit 110b in response to the invocation from the information obtaining unit 111c.

When the state in which both of the average utilizations of the CPUs and the memories stay less than 10% continues for 30 minutes or more, the electric power control determining unit 111b determines that a half of the hardware resources, i.e., the CPUs and the memories can be disconnected (step S501). The electric power control determining unit 111b then exempts a hardware resource which cannot be disconnected for a structural reason of the system from a disconnection target (step S502) and calculates, while securing necessary memory capacity, possible combinations of hardware resources which can be disconnected (step S503).

After that, the electric power control determining unit 111b determines whether or not there is a combination enabling a disconnection by a cabinet unit among the possible combinations of the hardware resources for disconnection (step S504). When there is a combination enabling a disconnection by a cabinet unit as a result of the determination ("Yes" at step S504), the electric power control determining unit 111b operates the resource controller 111a to perform a disconnection by a cabinet unit (step S505) to end the process. When there is no combination enabling a disconnection by a cabinet unit ("No" at step S504), the electric power control determining unit 111b operates the resource controller 111a to disconnect separate resources in both of the cabinets (step S506) to end the process. Here, an explanation for again incorporating the disconnected hardware resources will be omitted since the process is the same as that of the first embodiment.

As explained so far, the information obtaining unit 111c provided in the inside of the system controller 111 obtains the usage states of the CPUs and the memories as the operation state of the system boards SB31 to S34 of the cabinet 13 and the operation state of the system boards SB41 to SB44 of the cabinet 14 in the server apparatus 101 according to the second embodiment. Then, the information obtaining unit 111c calculates the average utilization of the CPUs and the average utilization of the memories of the system boards and determines whether or not any system board can be disconnected.

When the disconnection of hardware resources is available as a result of the determination, the electric power control determining unit 111b calculates, while securing necessary memory capacity, possible combinations of the hardware resources which can be disconnected. When there is a combination enabling a disconnection by a cabinet unit, the disconnection by a cabinet unit is performed. The disconnection by a cabinet unit with the memory capacity taken into consideration allows efficiently reducing the electric power consumption to fit in with the system structure.

[c] Third Embodiment

Figure 14:
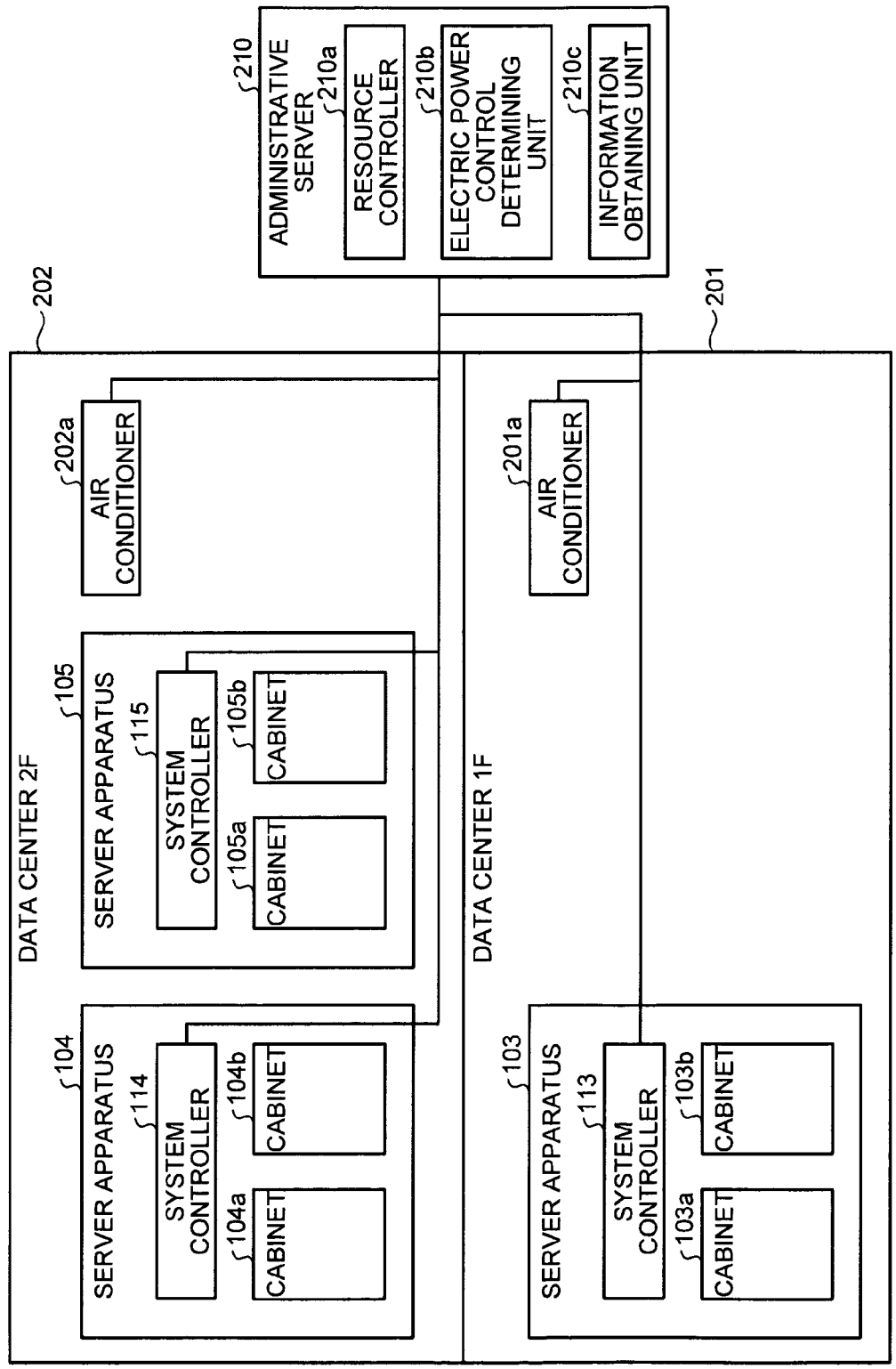
FIG. 14 is a brief overview of an information processing system according to a third embodiment.

In a third embodiment, a configuration in which at least one server apparatus is provided on each of a plurality of floors in a data center and the like will be explained. FIG. 14 is a brief overview of an information processing system according to the third embodiment. In the system illustrated in FIG. 14, a server apparatus 103 and an air conditioner 201a which cools a space over a floor 201 are provided on the floor 201 which corresponds to the first floor of the data center, and server apparatuses 104 and 105 and an air conditioner 202a which cools a space over a floor 202 are provided on the floor 202 which corresponds to the second floor of the data center.

The server apparatuses 103 to 105 have the same configuration as those disclosed in the first and the second embodiments. The server apparatus 103 is provided with cabinets 103a and 103b and a system controller 113 which transmits respective operation states of the cabinets 103a and 103b to an administrative server 210. The server apparatus 104 is provided with cabinets 104a and 104b and a system controller 114 which transmits respective operation states of the cabinets 104a and 104b to the administrative server 210. Similarly, the server apparatus 105 is provided with cabinets 105a and 105b and a system controller 115 which transmits respective operation states of the cabinets 105a and 105b to the administrative server 210.

The administrative server 210 is a controller which controls an entirety of the data center and provided with a resource controller 210a, an electric power control determining unit 210b, and an information obtaining unit 210c. The information obtaining unit 210c monitors a usage state of hardware resources of the entirety of the data center. Specifically, the information obtaining unit 210c uses information obtained from the server apparatuses 103 to 105 to determine whether or not to execute a hardware resource disconnection.

The electric power control determining unit 210b determines possible combinations of hardwares to be disconnected, selects a combination the electric power consumption of which is the least, and makes the resource controller 210a perform the disconnection.

For example in stopping any one of the server apparatuses 103 to 105, the server apparatus 103 on the first floor of the data center is disconnected preferentially. Since only the server apparatus 103 is present on the first floor of the data center, the air conditioner 201a is also stopped when the server apparatus 103 is stopped, so that the electric power consumption can further be reduced.

Figure 15:
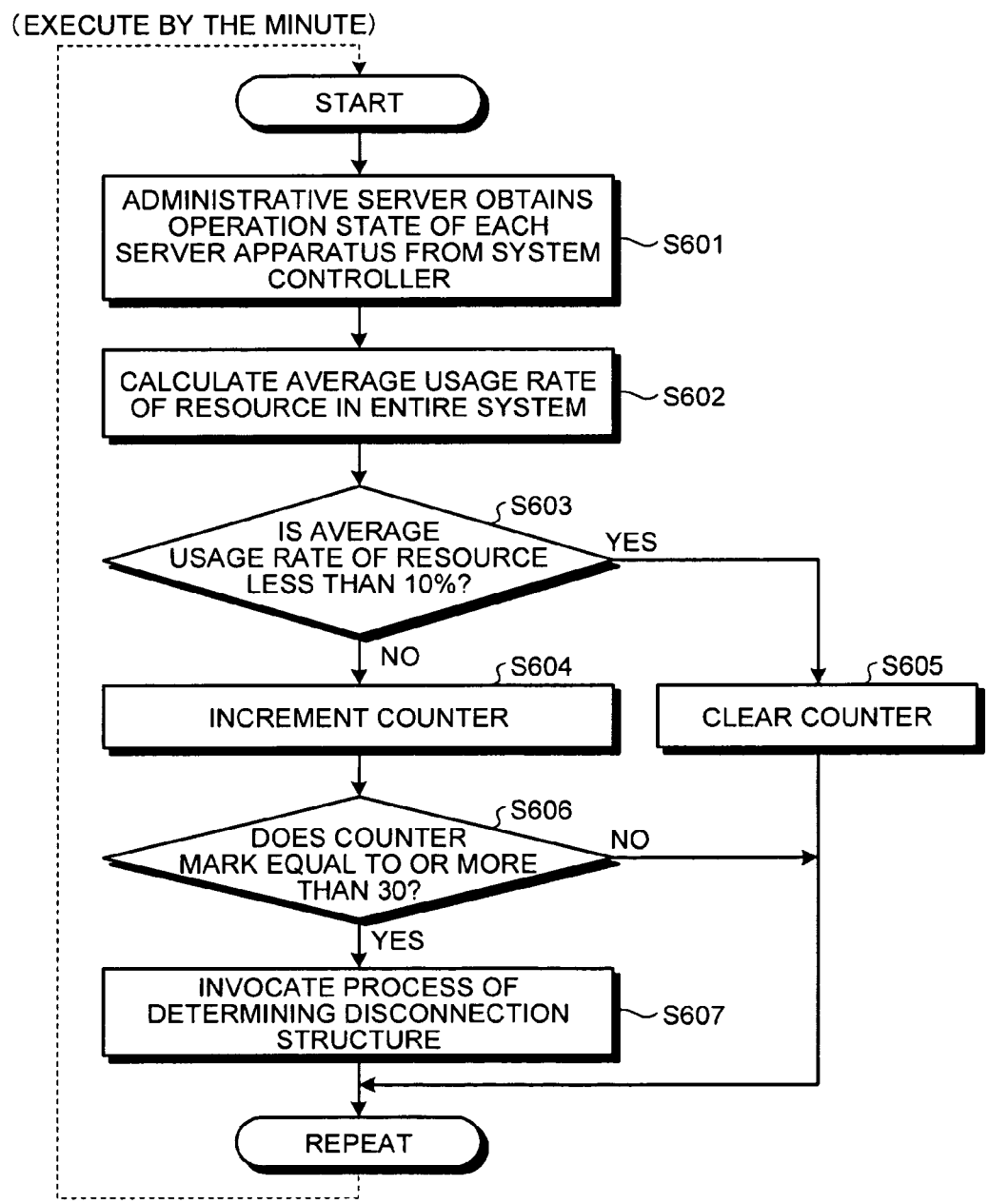
FIG. 15 is a flowchart of a process of determining whether or not to disconnect a hardware resource in the third embodiment.

Next a processing operation of the administrative server 210 will be explained. FIG. 15 is a flowchart of a process, performed by the administrative server 210, of determining whether or not to disconnect a hardware resource. The flowchart in FIG. 15 illustrates a processing operation which is repetitively executed at predetermined intervals, for example, at one minute intervals, by the information obtaining unit 210c of the administrative server 210.

The information obtaining unit 210c first obtains an operation state from the system controller of each server apparatus (step S601). The information obtaining unit 210c calculates an average utilization of hardware resources of the entirety of the system based on the obtained information (step S602).

When the calculated average utilization of the hardware resources is less than 10% ("Yes" at step S603) for example, the information obtaining unit 210c increments a figure of a counter by one (step S604). On the other hand, when the average utilization of the hardware resources is equal to or more than 10% ("No" at step S603), the information obtaining unit 210c clears the figure of the counter (step S605) to end the process.

When the counter marks equal to or more than 30, i.e., when a state in which the average utilization of the hardware resources stays less than 10% continues for 30 minutes or more ("Yes" at step S606) for example, the information obtaining unit 210c invokes a process of determining a disconnection structure (step S607) to end the process, and ends the process directly when the counter marks less than 30 ("No" at step S606), for example.

Figure 16:
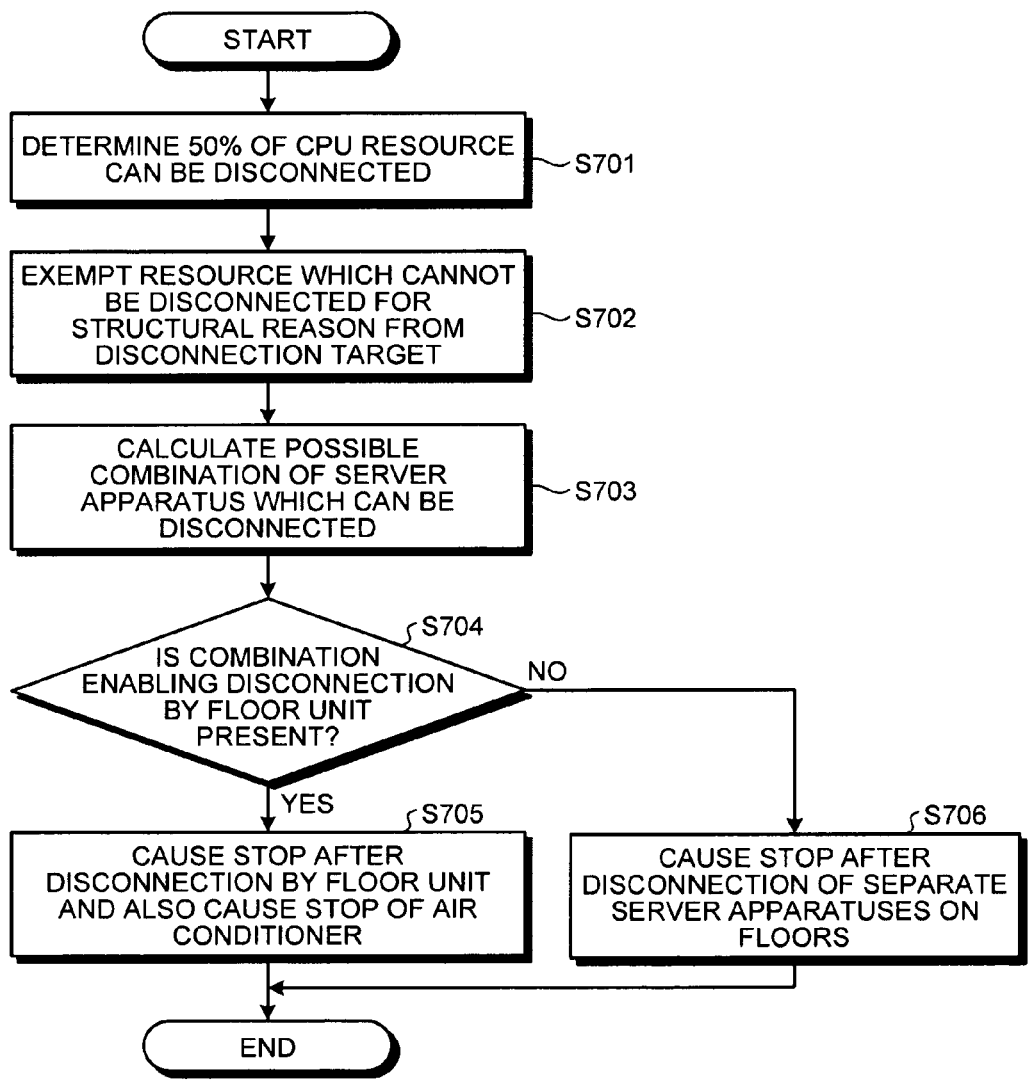
FIG. 16 is a flowchart of a process of determining a disconnection structure in the third embodiment.

FIG. 16 is a flowchart of the process of determining a disconnection structure. The processing operation illustrated in FIG. 16 is performed by the electric power control determining unit 210b in response to the invocation from the information obtaining unit 210c.

When the state in which the average utilization of the hardware resources stays less than 10% continues for 30 minutes or more, the electric power control determining unit 210b determines that a half of the hardware resources can be disconnected (step S701). The electric power control determining unit 210b then exempts a hardware resource which cannot be disconnected for a structural reason of the system from a disconnection target (step S702) and calculates possible combinations of hardware resources which can be disconnected (step S703).

After that, the electric power control determining unit 210b determines whether or not there is a combination enabling a disconnection by a cabinet unit among the possible combinations of the hardware resources for disconnection (step S704). When there is a combination enabling a disconnection by a cabinet unit as a result of the determination ("Yes" at step S704), the electric power control determining unit 210b operates the resource controller 210a to perform the disconnection by a cabinet unit (step S705) to end the process. When there is no combination enabling a disconnection by a cabinet unit ("No" at step S704), the electric power control determining unit 210b operates the resource controller 210a to disconnect separate resources on both floors (step S706) to end the process. Here, an explanation for again incorporating the disconnected hardware resources will be omitted since the process is the same as those of the first and the second embodiments.

As explained so far, in the configuration in which at least one server apparatus is provided on each of a plurality of floors in the data center in the information processing system according to the third embodiment, an operation state of each server apparatus is obtained and a disconnection is controlled to be performed by a floor unit when a redundant resource is present, so that facilities provided for each floor can also be a target of the reduction of the electric power consumption.

Here, though the case of controlling by a floor unit in a data center is taken as an example in the above explanation, it is possible to perform a disconnection by a block unit on the same floor in a data center or a building unit of a data center, or to control a disconnection of hardware resources hierarchically by a building unit, a floor unit, a block unit, and then a cabinet unit.

In the information processing apparatus provided with a plurality of cabinets each of which includes at least one processing unit according to the embodiments, a redundancy of hardware resources including a processing unit and the like is determined and a combination enabling a disconnection of the hardware resources by a cabinet unit is selected in performing a disconnection of a processing unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
  a first cabinet including
    a first processing unit provided with a first processor and a first computing process utilization measuring unit that measures a computing process utilization indicating a load per unit time of the first processor, and
    a second processing unit provided with a second processor and a second computing process utilization measuring unit that measures a computing process utilization of the second processor;
  a second cabinet including
    a third processing unit provided with a third processor and a third computing process utilization measuring unit that measures a computing process utilization of the third processor, and
    a fourth processing unit provided with a fourth processor and a fourth computing process utilization measuring unit that measures a computing process utilization of the fourth processor;
  an operating system executed by at least one of the first to the fourth processors and notifies the first to the fourth computing process utilizations from the first to the fourth computing process utilization measuring units; and
  a system controller includes a resource controller that executes one of a disconnection and an incorporation of at least one of the first to the fourth processing units based on the first to the fourth computing process utilizations notified from the operating system part, and selects a combination of redundant processing units to be an object of disconnection so that electric power consumption of the information processing apparatus becomes the least thereamong, wherein
  the information processing apparatus includes an adopting unit that preferentially adopts the combination enabling the disconnection of all of the processing units in a cabinet in the combination, wherein
  the resource controller further determines whether a sum of memory capacities of the first to the fourth storage devices which remain after the disconnection of at least one of the first to the fourth processing units is equal to or more than a memory capacity required by the information processing apparatus, cancels to execute disconnection of at least one of the first to the fourth processing units, and selects the combination of the redundant processing units to be the object of disconnection so that the sum of memory capacities of the storage devices of the other processing units to be not the object of disconnection is equal to or more than the memory capacity required by the information processing apparatus after the disconnection of at least one of the first to the fourth processing units.

2. The information processing apparatus according to claim 1, wherein
  the first to the fourth processing units are further provided with first to fourth storage devices and first to fourth memory capacity utilization measuring units that measure memory capacity utilizations of the first to the fourth storage devices, respectively, the operating system notifies the first to the fourth memory capacity utilizations respectively from the first to the fourth memory capacity utilization measuring units, and the resource controller executes one of the disconnection and the incorporation of at least one of the first to the fourth processing units based on the notified first to fourth memory capacity utilizations.

3. The information processing apparatus according to claim 1, wherein the operating system part notifies the first to the fourth computing process utilizations respectively from the first to the fourth computing process utilization measuring units, and the resource controller calculates an average computing process utilization which is an average of the first to the fourth computing process utilizations and executes one of the disconnection and the incorporation of at least one of the first to the fourth processing units based on the average computing process utilization.

4. The information processing apparatus according to claim 2, wherein the operating system part notifies the first to the fourth memory capacity utilizations respectively from the first to the fourth memory capacity utilization measuring units and calculates an average value of the memory capacity utilizations based on the notified first to fourth memory capacity utilizations, and the resource controller calculates an average memory capacity utilization which is an average of the first to the fourth memory capacity utilizations and executes one of the disconnection and the incorporation of at least one of the first to the fourth processing units based on the average memory capacity utilization.

5. A method of controlling an information processing apparatus provided with a plurality of cabinets each of which includes at least one processing unit that performs an information process in cooperation, the method being performed by a controller connected to the information processing apparatus and the method comprising:

obtaining information that indicates an operation state of the processing unit;

determining a possible combination of the processing unit that can be disconnected from the information process based on the information obtained at the obtaining;

performing one of disconnecting and incorporating at least one of the processing unit and the cabinets based on a result of the determination at the determining;

selecting a combination of redundant processing units to be an object of disconnection so that electric power consumption of the information processing apparatus becomes the least thereamong;

preferentially adopting the combination enabling the disconnection of all of the processing units in a cabinet in the combination;

determining whether a sum of memory capacities of the first to the fourth storage devices which remain after the disconnection of at least one of the first to the fourth processing units is equal to or more than a memory capacity required by the information processing apparatus, cancels to execute disconnection of at least one of the first to the fourth processing units; and selecting the combination of the redundant processing units to be the object of disconnection so that the sum of memory capacities of the storage devices of the other processing units to be not the object of disconnection is equal to or more than the memory capacity required by the information processing apparatus after the disconnection of at least one of the first to the fourth processing units.

6. A computer-readable non-transitory medium storing a program of controlling an information processing apparatus provided with a plurality of cabinets each of which includes at least one processing unit that performs an information process in cooperation, the program being operated in a controller connected to the information processing apparatus, the program causing the controller to execute a process comprising:

obtaining information that indicates an operation state of the processing unit;

determining a presence of a processing unit which can be disconnected from the information process when a state in which an average utilization of a processor provided in each of the processing unit stays less than a predetermined value continues for a predetermined period of time based on the information obtained at the obtaining;

determining a possible combination of the processing unit which can be disconnected when the presence of the processing unit which can be disconnected is determined at the presence determining;

adopting a combination enabling a disconnection by a cabinet unit in the combination;

disconnecting at least one of the processing unit and the cabinet based on the combination adopted at the determining and the adopting;

selecting a combination of redundant processing units to be an object of disconnection so that electric power consumption of the information processing apparatus becomes the least thereamong;

preferentially adopting the combination enabling the disconnection of all of the processing units in the cabinet in the combination;

determining whether a sum of memory capacities of the first to the fourth storage devices which remain after the disconnection of at least one of the first to the fourth processing units is equal to or more than a memory capacity required by the information processing apparatus, cancels to execute disconnection of at least one of the first to the fourth processing units; and selecting the combination of the redundant processing units to be the object of disconnection so that the sum of memory capacities of the storage devices of the other processing units to be not the object of disconnection is equal to or more than the memory capacity required by the information processing apparatus after the disconnection of at least one of the first to the fourth processing units.

7. The information processing apparatus according to claim 1, wherein the system controller obtains the computing process utilizations of the first to the fourth processing units, determines a presence of a processing unit which can be temporarily disconnected from an information process that the first to the fourth processing units execute in cooperation with each other when a state in which an average utilization of a processor provided in each of the first to the fourth processing units stays less than a predetermined value continues for a predetermined period of time based on the computing process utilizations obtained, determines a possible combination of the processing unit which can be disconnected when the presence of the processing unit which can be disconnected is determined, preferentially adopts the combination enabling the disconnection of all of the processing units in a cabinet in the combination, and disconnects the processing unit and the cabinet based on the combination adopted.

* * * * *